US008046999B2

(12) United States Patent
Doty

(10) Patent No.: US 8,046,999 B2
(45) Date of Patent: Nov. 1, 2011

(54) HIGH-TEMPERATURE DUAL-SOURCE ORGANIC RANKINE CYCLE WITH GAS SEPARATIONS

(75) Inventor: F David Doty, Columbia, SC (US)

(73) Assignee: Doty Scientific, Inc., Columbia, SC (US)

( * ) Notice: Subject to any disclaimer, the term of this patent is extended or adjusted under 35 U.S.C. 154(b) by 0 days.

(21) Appl. No.: 12/673,554

(22) PCT Filed: Nov. 25, 2007

(86) PCT No.: PCT/US2007/085484

§ 371 (c)(1),
(2), (4) Date: Feb. 15, 2010

(87) PCT Pub. No.: WO2009/048479

PCT Pub. Date: Apr. 16, 2009

(65) Prior Publication Data

US 2010/0300093 A1    Dec. 2, 2010

Related U.S. Application Data

(60) Provisional application No. 60/979,718, filed on Oct. 12, 2007.

(51) Int. Cl.
*F01K 25/06* (2006.01)
*F01K 21/06* (2006.01)
*F01K 25/08* (2006.01)
*F01K 25/00* (2006.01)

(52) U.S. Cl. ............... 60/649; 60/646; 60/651; 60/671

(58) Field of Classification Search ............. 60/641.1, 60/641.2, 641.8, 641.15, 651, 671, 657, 646, 60/649, 655

See application file for complete search history.

(56) References Cited

U.S. PATENT DOCUMENTS 3,950,941 A * 4/1976 Ohrn ..................... 59/93
(Continued)

FOREIGN PATENT DOCUMENTS

KR    10-0016963    2/1984
(Continued)

OTHER PUBLICATIONS

Price et al, Modular Trough Power Plant Cycle and Systems Analysis, Jan. 2002, National Renewable Energy Laboratory, p. 7-16.*

(Continued)

*Primary Examiner* — Thomas Denion
*Assistant Examiner* — Christopher Jetton
(74) *Attorney, Agent, or Firm* — Oppedahl Patent Law Firm LLC

(57) ABSTRACT

In a dual-source organic Rankine cycle (DORC), the condensed and slightly sub-cooled working fluid at near ambient temperature (~300 K) and at low-side pressure (0.1 to 0.7 MPa) is (1) pumped to high-side pressure (0.5-5 MPa), (2) pre-heated in a low-temperature (LT) recuperator, (3) boiled using a low-grade heat source, (4) super-heated in a high-temperature (HT) recuperator to a temperature close to the expander turbine exhaust temperature using this exhaust vapor enthalpy, (5) further super-heated to the turbine inlet temperature (TIT) using a mid-grade heat source, (6) expanded through a turbine expander to the low-side pressure, (7) cooled through the HT recuperator, (8) cooled through the LT recuperator, (9) mostly liquefied and slightly subcooled in a condenser, and (10) the condensed portion is returned to the pump to repeat this cycle.

6 Claims, 2 Drawing Sheets

U.S. PATENT DOCUMENTS

| | | | |
|---|---|---|---|
| 3,950,949 | A | 4/1976 | Martin et al. |
| 4,031,952 | A | 6/1977 | Contour |
| 4,046,520 | A | 9/1977 | Kemp et al. |
| 4,055,049 | A | 10/1977 | Murphy et al. |
| 4,286,141 | A * | 8/1981 | MacCracken ............ 392/346 |
| 4,286,579 | A * | 9/1981 | Johnston ............ 126/694 |
| 4,304,585 | A | 12/1981 | Oda et al. |
| 4,338,788 | A | 7/1982 | Fink |
| 4,347,706 | A | 9/1982 | Drost |
| 4,361,009 | A | 11/1982 | Schluderberg |
| 4,367,629 | A | 1/1983 | Cann |
| 4,428,202 | A | 1/1984 | Carson |
| 4,428,203 | A | 1/1984 | Carson |
| 4,455,835 | A | 6/1984 | Durrant |
| 4,476,684 | A | 10/1984 | Phillips |
| 4,479,353 | A | 10/1984 | Schluderberg |
| 4,479,355 | A | 10/1984 | Guide |
| 4,557,112 | A | 12/1985 | Smith |
| 4,576,005 | A | 3/1986 | Force |
| 4,646,541 | A * | 3/1987 | Reid et al. ............ 62/476 |
| 4,676,305 | A | 6/1987 | Doty |
| 4,738,111 | A | 4/1988 | Edwards |
| 5,228,293 | A | 7/1993 | Vitale |
| 5,259,444 | A | 11/1993 | Wilson |
| 5,444,981 | A | 8/1995 | Kakovitch |
| 5,526,646 | A | 6/1996 | Bronicki |
| 5,639,929 | A | 6/1997 | Bharadwaj |
| 5,723,707 | A | 3/1998 | Heyse et al. |
| 5,925,223 | A | 7/1999 | Simpson et al. |
| 6,119,457 | A | 9/2000 | Kawamura |
| 6,128,916 | A * | 10/2000 | Callahan et al. ............ 62/475 |
| 6,161,386 | A | 12/2000 | Lokhandwala |
| 6,629,413 | B1 | 10/2003 | Wendt et al. |
| 6,857,268 | B2 | 2/2005 | Stinger et al. |
| 6,880,344 | B2 | 4/2005 | Radcliff et al. |
| 7,013,644 | B2 | 3/2006 | Radcliff et al. |
| 7,062,913 | B2 | 6/2006 | Christensen |
| 7,100,380 | B2 | 9/2006 | Brasz et al. |
| 7,225,621 | B2 | 6/2007 | Zimron et al. |

FOREIGN PATENT DOCUMENTS

| | | |
|---|---|---|
| KR | 10-2005-0056941 | 6/2005 |
| WO | 2006-092786 | 9/2006 |

OTHER PUBLICATIONS

International Search Report for PCT/US2007/085484, Sep. 5, 2008.

M Kanoglu, "Exergy analysis of a dual-level binary geothermal power plant",Geothermics, 31, 709-725, 2002.

A Borsuklewicz-Gozdur, W Nowak "Comparative analysis of natural and synthetic refrigerants in application to low temperature Clausius-Rankine cycle", Energy, 32, 344-352, 2007.

K Weissermel, HJ Arpe, Industrial Organic Chemistry, 4th ed., Wiley, 2003.

CH Bartholomew and RJ Farrauto, Industrial Catalytic Processes, Wiley, 2006.

JD Seader and EJ Henley, "Separation Process Principles", 2nd ad., Wiley, 2006.

BT Liu, KH Chien, CC Wang, "Effect of working fluids on organic Rankine cycle for waste heat recovery", Energy, 29, 1207-1217, 2004.

E Prabhu, Solar Trough organic Rankine Electricity System (Stores', NREL/SR-550-39433, http://www.nrel.gov/docs/fy06osti/39433.pdf, 2006.

H Price and D Kearney, Reducing the Cost of Energy from Parabolic Trough Solar Power Plants, NREL/CP-550-33208, 2003.

H Price and V Hassani, "Modular Through Power Plant Cycle and System Analysis" NNREL/TP-550-31240, 2002.

AP Steynberg, ME Dry, eds.,Studies in Surface Science and Catalysis 152, Fischer-Tropsch Technology, Elsevier, 2004.

R DiPippo, Geothermal Power Plants: Principles, Applications and Case Studies, Elsevier Ltd, Oxford U.K., 2005.

DG Wilson and J Ballou, "Design and Performance of a High-Temperature Regenerator Having Very High Effectiveness, Low Leakage and Negligible Seal Wear", paper GT 2006-90096, Turbo-Expo 2006, Barcelona.

G Olah and A Molar, "Hydrocarbon Chemistry", 2nd ed., Wiley, 2003.

LR Rudnick, Synthetics, Mineral Oils, and Bio-based Lubricants: Chemistry and Technology, CRC, Boca Raton, 2006.

D Mills, GL Morrison, and P LeLievre, "Design of a 240 MWE Solar Thermal Pwer Plant", Ausra, http:www.ausra.com/pdfs/Design240Msolarthermalpowerplant_Mills_2004.pdf 2004.

* cited by examiner

HIGH-TEMPERATURE DUAL-SOURCE ORGANIC RANKINE CYCLE WITH GAS SEPARATIONS

CROSS-REFERENCE TO RELATED APPLICATIONS

This application claims priority from U.S. application No. 60/979,718, which application is incorporated herein by reference for all purposes.

FIELD OF THE INVENTION

The field of this invention is organic Rankine turbine power cycles. More specifically, a cycle that is optimized for efficient generation of electricity from mid-grade and low-grade heat sources when both sources are simultaneously available in comparable magnitudes, and a cycle that includes separations of reaction products from the working fluid.

BACKGROUND OF THE INVENTION

A large number of Rankine cycles for the production of mechanical and then electrical power from a single thermal source have been highly developed over the past century. Over the past four decades, a large number of variations have been described and evaluated for the purpose of improving the economic utilization of low-grade heat, as available from most geothermal sources, typically in the range of 360 K to 450 K, or mid-grade heat, as available from concentrated solar power (CSP), typically in the range of 480 K to 730 K.

Many geothermal projects have utilized an organic working fluid such as isobutane, as it has a fairly high vapor pressure at the typical condensing temperature (~300 K) and has a relatively low latent heat of vaporization at the typical boiler temperature, ~400 K. Some have utilized multi-component fluids, including propane/ethane mixtures, and some have used synthetic refrigerants such as R-22B1, $CHBrF_2$, or ammonia, $NH_3$.

For mid-grade heat sources, cascaded cycles have recently been utilized in which a higher boiling fluid, such as benzene, water, or toluene, is heated to the maximum available temperature; and its condenser, typically near 430 K, drives the boiler for a loop utilizing a lower-boiling fluid such as isobutane. Pressure ratios are typically about 10 in each loop, and recuperation is also usually utilized, as the expander temperature ratio ($T_R = T_{IT}/T_{OT}$, turbine inlet temperature divided by turbine outlet temperature) is only about 1.15 in such fluids—because $\gamma$, the ratio of $C_P$ to $C_V$, is under 1.1 at the typical expander conditions. Others have utilized mixtures of ammonia and water that are at some points in the cycle mixed and at other points separated in ways that in principle permit the major heat transfers to take place with reduced temperature differences and hence improved efficiency, albeit with considerable increase in complexity, mass, and cost. These have all been designated as Organic Rankine Cycles (ORCs), as distinguished from conventional water steam cycles.

The recent trend toward higher peak temperatures has pushed the fluid choice toward aromatics, such as benzene and toluene, because of their very low susceptibility to dehydrogenation. However, their low vapor pressures at ambient temperatures require the use of costly, cascaded cycles to avoid sub-atmospheric systems (which lead to ingress of air and moisture through unavoidable minute leaks).

Widespread misconceptions related to chemical stability include the notion that higher boiling points generally correlate with high thermal stability and that the upper temperature limit is mostly determined by the fluid choice. We disclose herein methods for increasing the practical temperature limit for light alkanes by 200-350 K primarily from the combination of (a) accommodation of hydrogen evolution, (b) minimization of high-temperature residence time, (c) deactivation of catalytically active surfaces, (d) incorporation of on-line membrane separations processes, (e) increasing the condensing pressure, and (f) choosing a more optimum fluid mixture.

The latent heat of vaporization of the working fluid and the differences in specific heats between the liquid and vapor phases make full optimization (closely approaching second-law limits) impossible for a single heat source with known working fluids. When two heat sources are available, this problem may be effectively solved. We disclose herein a method of achieving much higher overall efficiency by using a combination of a mid-grade source (such as CSP) and a low-grade source, such as geothermal, industrial waste, low-grade solar concentrators, low-cost flat-plate solar collectors, or oceanic thermal gradients.

A Recent CSP ORC Example. A recent (2005) economic analysis of a cascaded ORC for a field of solar troughs (Prabhu, US-NREL/SR-550-39433, 2006), estimated the installed cost of just the 5 $MW_{PE}$ power plant would be over $3/W_{PE}$, where $W_{PE}$ is the peak electrical power output. This cost is an order of magnitude beyond what is needed to be economically viable in most cases—especially for solar, where the average power is usually under 28% of the peak power. In this study, about two-thirds of the cost was the installation cost. The highest peak net ORC efficiency predicted in this study for a source temperature of 663 K was 30.5%, which, though 50% higher than seen in some other recent ORC examples, is still about 55% of second-law theoretical limits with a 300 K sink. However, average efficiencies throughout the year are typically 8-18%, as both ORC and collector efficiency decrease from mid-day performance.

Reducing the cost by an order of magnitude will require making the power plant compact enough to be easily transported from the factory to the field site by truck in a reasonable number of easily separable modules after check-out at the factory. In the above study, the 5 MW power plant used an area of approximately 5,000 $m^2$. Factory production of such a large power plant is completely out of the question. The size needs to be reduced by one to two orders of magnitude.

Overview of the HT Dual-source ORC (HT-DORC). The current invention has two main components: (1) a method of efficiently utilizing heat from two separate sources (one of lower grade and one of higher grade) to allow significantly higher total efficiency and reduced system cost; and (2) a method of substantially extending the upper temperature limit of exemplary working fluids (those with vapor pressure greater than 0.1 MPa at ~270 K and having thermal conductivity greater than 0.035 W/m-K at 500 K), primarily by accommodating the evolution of hydrogen and minimizing HT residence time.

With respect to the dual-source feature, the novel approach utilizes recuperation in the Rankine cycle to the extent practical (as partially limited by the thermodynamic properties of the working fluid), but with most of the heat of vaporization and some of the liquid preheating being provided by a low-grade heat source while the final superheating is provided by a mid-grade or high-grade heat source.

There are three fundamental advantages to the highly-recuperated DORC. In order of generally decreasing significance, these are:

(1) The boiling temperature can be greatly reduced with no adverse affect on efficiency of utilization of the higher-grade (more expensive) heat source (provided the boiling enthalpy is available from a low-cost heat source). This allows the use of fluids having higher thermal conductivity and higher vapor pressure at the condenser temperature, which allows for reductions in the size and cost of the expander, recuperators, and condenser.

(2) Only one expander turbine is required to approach theoretical efficiency limits, and its size is reduced (because of the higher condenser pressure and lower molecular mass of the working fluid).

(3) The working fluid mixture and the pressures may be selected such that temperature differences in all the heat exchangers may be more fully minimized at all points in the cycle.

The optimum working fluid would (a) have at least 0.1 MPa vapor pressure at the minimum condenser nighttime temperature (generally between 250 K and 285 K), (b) have excellent chemical stability in the super-heater, (c) be sub-critical near the temperature of the lower-grade heat source, (d) be environmentally safe, (e) have high thermal conductivity in the vapor phase, (f) have high autoignition temperature, and (g) have high $\gamma$. Most prior discussions of optimum fluid selection have focused largely on only one of the above criteria, or on another—the slope of the saturated vapor line on the T-S diagram, which is now irrelevant in the DORC.

Reducing the Size and cost of ORCs. The most important innovation for reducing cost is to get the most out of a single thermodynamic loop and a single turbine expander (by far the most expensive single component in prior ORCs) while still fully minimizing temperature differences in all the exchangers. Cascaded loops have been chosen in the past to avoid dehydrogenation while still keeping the condenser pressures above 0.1 MPa. We show that it is much better to instead optimally address the chemical stability problem.

The second most important change is to increase the condenser pressure. This is essential for reducing the size of the condenser and recuperators, where relative pressure losses scale inversely with the square of the pressure. Increasing the condenser pressure is also beneficial in improving chemical stability of the working fluid and in simplifying the separation of light gases ($H_2$, $CH_4$, $C_2H_6$, etc.) from the vapor stream, which we show to be essential for dramatically increasing the temperature limit. The use of higher condenser pressure, lower pressure ratio, and improved HT recuperation allows an order-of-magnitude reduction in the cost of the single expander turbine needed in the DORC.

The third most important requirement for reducing the power plant size and cost is to use ultra-compact recuperators. Gas-to-gas recuperator designs that are more than an order of magnitude more compact than in the referenced example have been well known for two decades.

For solar CSP, increasing the efficiency of utilization of the higher-grade heat source is actually the most significant factor in reducing total system cost, as the cost of the solar field is often three times the cost of the ORC. The DORC allows this efficiency to be nearly doubled with moderate temperature increase. Solar concentrators have achieved temperatures above 1500 K so a significant increase in collector temperature (compared to 660 K) without much increase in radiation losses should be straightforward. However, the fluid used to transfer heat from the solar field must have a much higher boiling point, and the chemical stability of the fluids must be dramatically improved. Solutions to these issues are presented.

Finally, it is necessary to improve off-design performance so that the cost of thermal storage can be greatly reduced. Measures for improving off-design performance are disclosed.

Removal of Reaction Products. In the conventional ORC, the loss of expansion ratio that results from a non-condensable partial pressure in the condenser has a very detrimental effect on expander shaft power and efficiency, as the increased turbine outlet enthalpy is not usable. In the DORC, where recuperation above the boiling point is very effectively utilized (as will be seen), an increased turbine outlet temperature means that less final superheating is required. Hence, the efficiency of utilization of the heat sources is hardly effected by high $H_2$ partial pressure in the condenser. The mass flow rate of the working fluid must be increased for a given output power, and the expander must continue to work efficiently at a lower expansion ratio; but these are minor technical issues. While it is still preferable to maintain fairly low $H_2$ partial pressure in the condenser, high enough $H_2$ partial pressures are acceptable that the task of separating light-gas reaction products in the DORC becomes practical. Several methods for achieving the needed removal of reaction-products (both light and heavy) from the working fluid are disclosed.

Applications for DORCs. There are a number of very important (and neglected) cases where substantial amounts of low-grade and mid-grade waste heat may be available simultaneously. Fischer-Tropsch Synthesis (FTS) reactors reject hundreds of megawatts at 500 K to 650 K, and lesser amounts are rejected in condensers at lower temperatures. A wind-electrolysis-fueled FTS process is the subject of another pending patent application. There, amounts of heat greater than the FTS reaction are also rejected from the water electrolysis at 400 K to 440 K, and perhaps eventually at up to 500 K.

Excellent solar resources are often present near many good geothermal resources. In such cases, much more economical resource utilization can be achieved by using a DORC with the geothermal resource driving the boiler (perhaps near 400 K) in combination with a concentrated solar super-heater at 650 to 820 K. Prior geothermal ORCs have usually achieved 10-14% thermal efficiency, and prior concentrated solar ORCs have generally achieved 20-32% efficiency. The isobutane DORC can exceed 27% electrical conversion efficiency of the total thermal input (low-grade plus mid grade), and the electrical output may exceed 55% of the more expensive, mid-grade (CSP) contribution.

Vertical oceanic thermal gradients in some bays can reach 25° C. within 150 m of depth (though usually the gradients are much less), and there have been some attempts to utilize these gradients to generate electrical power using various ORCs in what is called Oceanic Thermal Energy Conversion (OTEC). Such attempts have achieved only 1% to 3% thermal efficiency, and thus have not been economical. However, in most cases where such oceanic thermal gradients are found, the local solar resource is also excellent. Hence, a much more cost effective engine can be made by using a DORC with a condensing temperature of 285 K (a little above the deep-water bay temperature), a boiler temperature at 300 K (a little below the surface water temperature), and a concentrated solar super-heater at ~750 K. The low-grade boiler heat allows one to obtain about 50% efficiency in conversion of the mid-grade solar energy, or perhaps 10% conversion of total thermal input.

Flat-plate solar collectors and low-grade solar concentrators provide low-quality solar heat at much lower cost per GJ than the mid-grade energy from high-temperature CSP. The combination of flat-plate collectors or low-grade solar concentrators providing the boiling enthalpy at 350-480 K with CSP providing the final superheating at 650-800 K promises higher cost effectiveness for renewable electricity than any other solar option currently on the horizon.

The DORC would also allow much higher efficiency in combined-cycle fossil-fuel power plants located near geothermal sources. The steam condensing temperature could be higher, perhaps 400-450 K, to reduce the cost of this steam cycle heated by the exhaust from the fossil-fueled turbine. The steam condenser could provide the mid-grade heat to the DORC, with geothermal providing its low-grade heat.

SUMMARY OF THE INVENTION

A dual-source organic Rankine cycle (DORC) is disclosed that permits substantially improved conversion of low-grade (300-500 K) and mid-grade (500-850 K) heat sources to electrical power using a single primary loop when heat is available from both sources simultaneously. The working fluid preferably has vapor pressure above 0.1 MPa at the minimum condensing temperature, mean molecular mass below 70, critical temperature near that of the low-grade heat source, and consists mostly of isobutane. The condensed and slightly sub-cooled working fluid at near ambient temperature (~300 K) and at low-side pressure (0.1 to 0.7 MPa) is (1) pumped to high-side pressure (0.5-5 MPa), (2) pre-heated in a low-temperature (LT) recuperator, (3) boiled using a low-grade heat source, (4) super-heated in a high-temperature (HT) recuperator to a temperature close to the expander turbine exhaust temperature using this exhaust vapor enthalpy, (5) further super-heated to the turbine inlet temperature ($T_{IT}$) using a mid-grade heat source, (6) expanded through a turbine expander to the low-side pressure, (7) cooled through the HT recuperator, (8) cooled through the LT recuperator, (9) mostly liquefied and slightly subcooled in a condenser, and (10) the condensed portion is returned to the pump to repeat this cycle. The minor-fraction, non-condensable gas, mostly $H_2$, is periodically or continually separated from the condensable vapor, and heavy hydrocarbons are periodically or continually drained from the boiler. The usable temperature range of the exemplary fluid is dramatically increased by (1) accommodating hydrogen evolution from minor dehydrogenation of the alkanes; (2) periodically or continually removing undesired heavy reaction products from the fluid; (3) minimizing the fraction of time the fluid spends at high temperatures; and (4) using a mixture of mostly isobutane with minor fractions of propane, benzene, and isopentane for the working fluid.

DETAILED DESCRIPTION OF AN EXEMPLARY EMBODIMENT

Figure 1:
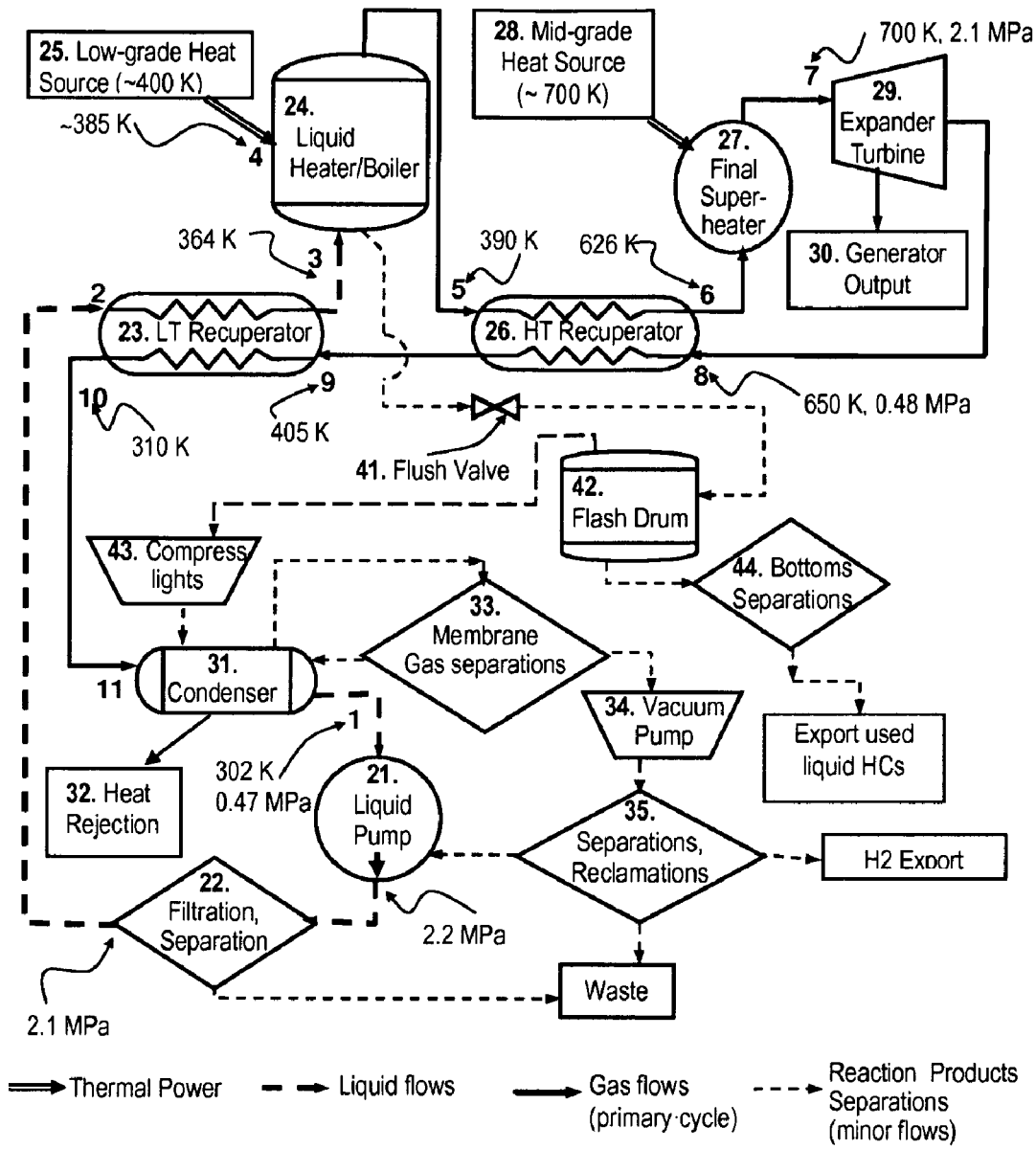
FIG. 1 is a system flow diagram of a doubly recuperated HT-DORC.

Fluid Chemistry Stabilization. Chemical stability is ultimately the limiting factor for DORC performance, at least when the higher-grade heat source is concentrated solar. Butanes have previously not been recommended for use above about 480 K, partly because it is assumed there may be some moist air ingress, leading to formation of organic acids and other oxygenates (the combination of copper and water very strongly catalyzes oxidation of alkanes). Heavier alkanes have often been mistakenly thought to be better suited for higher temperatures, as this trend is often seen in engine oils in oxidative environments. With no air ingress, the focus of the chemical stability problem is changed.

Table 1 lists some properties of the preferred working fluid constituents as well as a few primary reaction products and some high-boiling organics that are preferable to some fluids previously used as the heat transfer fluid from the HT solar field to the DORC. The other popular ORC working fluids are now less desirable—because of their lower vapor pressure, critical temperature either too low or too high, higher chemical reactivity, lower vapor-phase thermal conductivity, lower gamma, or higher ozone depletion rating. When dehydrogenation is accommodated and air and moisture are fully excluded, one of the better single indicators of chemical reactivity in the absence of catalysts is the Gibbs free energy per mass ($\Delta G_f/g$) at the maximum cycle temperature. For reference, this is listed in Table 1 at 700 K. The smaller this number, the more stable the compound will often be in the DORC, though this is only one factor. Another factor is the difference in polarity of the atoms, which is a reason to stick with pure HCs for the working fluid.

TABLE 1

DORC fluid data.

| Name | Formula | m.m. | freeze point, K | n.b.p. K | $T_C$, K | $p_c$, MPa | Auto-ignition temp., K | $\Delta G_f$, 700 K, kJ/g | v. pres., 300 K, kPa | gas k, 500 K, W/m-K | $\gamma$, $C_P/C_V$, 600 K, 1 MPa |
|---|---|---|---|---|---|---|---|---|---|---|---|
| ethylene | $C_2H_4$ | 28.05 | 104 | 169.4 | 282.3 | 5.04 | | 3.37 | 7200 | 0.0503 | 1.137 |
| propylene | $C_3H_6$ | 42.08 | 88 | 225.5 | 364.2 | 4.55 | | 3.03 | 1218 | 0.0442 | 1.091 |
| propane | $C_3H_8$ | 44.10 | 85 | 231.0 | 369.9 | 4.25 | 723 | 2.20 | 1000 | 0.0476 | 1.076 |
| 1-butene | $C_4H_8$ | 56.11 | 88 | 266.8 | 419.3 | 4.01 | 657 | 3.19 | 314 | 0.0433 | 1.066 |
| isobutane | $C_4H_{10}$ | 58.12 | 114 | 261.4 | 407.8 | 3.63 | 733 | 2.48 | 370 | 0.0442 | 1.059 |
| n-butane | $C_4H_{10}$ | 58.12 | 135 | 272.7 | 425.1 | 3.80 | 678 | 2.51 | 258 | 0.0441 | 1.060 |
| isopentane | $C_5H_{12}$ | 72.15 | 113 | 301.0 | 460.4 | 3.38 | 673 | 2.63 | 98 | 0.0408 | 1.051 |
| n-pentane | $C_5H_{12}$ | 72.15 | 143 | 309.2 | 469.7 | 3.37 | 533 | 2.64 | 73 | 0.0385 | 1.052 |
| benzene | $C_6H_6$ | 78.11 | 279 | 353.2 | 562.1 | 4.89 | 771 | 2.58 | 14 | 0.0289 | 1.070 |
| toluene | $C_7H_8$ | 92.14 | 180 | 383.8 | 591.8 | 4.13 | 808 | 2.47 | 4.16 | 0.0308 | 1.067 |
| water | $H_2O$ | 18.02 | 273 | 373.1 | 647.1 | 22.1 | | -11.6 | 3.54 | 0.0388 | 1.323 |
| 1-butyl-naphthalene | $C_{14}H_{16}$ | 184.3 | 253 | 561 | 792.0 | 2.68 | 810 | 2.75 | 0.002 | 0.021 | |
| dioctyl phthalate | $C_{24}H_{38}O_4$ | 390.6 | 224 | 657 | 806 | 11.8 | 780 | 1.02 | 1E-4 | — | |
| 1-n-dodecyl-naphthalene | $C_{22}H_{32}$ | 296.5 | 286 | 667 | 862 | 13 | ~800 | 3.1 | 1E-4 | — | |
| polyphenyl ether 5P4E | $C_{30}H_{26}O_4$ | 450 | 280 | 749 | ~900 | ~3 | 860 | ~2 | 1E-10 | — | |

The most detrimental reaction of light alkanes in ORCs has been dehydrogenation to an alkene of the same carbon number—and of course, with release of hydrogen. The alkenes then (relatively quickly) may crack to a lighter alkene or alkylate, metathesize, homologate, dimerize, or polymerize in combination with other alkenes or alkanes to heavier hydrocarbons (HCs). The primary problem is that the hydrogen doesn't condense, and hence it soon kills the expansion pressure ratio, maximum output power, and efficiency. Also, the heavier alkenes rather quickly dehydrogenate to dienes, aromatics, and alkenylarenes. Some of these—especially the alkenylarenes—will eventually polymerize and gum up the pump or coke up the superheater if not removed from the fluid.

The equilibrium constant $K_P$ for dehydrogenation of isobutane to butene is 4.9E-5 at 600 K, and 2.5E-3 at 700 K. However, the activation energies $E_a$ for dehydrogenation of propane and butanes are very high. Even on Pt catalysts, for example, $E_a$s have been estimated to be about 126 and 113 kJ/mol for propane and isobutane respectively. Hence, below about 700 K, dehydrogenation of these species at pressures of several MPa essentially occurs only on catalytic surfaces. The most effective catalysts for dehydrogenation are the noble metals, which obviously would not be present in the system. One reference (U.S. Pat. No. 5,639,929) shows about 40% oxidative dehydrogenation of a rich isobutane-$O_2$ mixture (~2.2:1 molar) in a fluidized Pt—$Al_2O_3$ bed (~80 μm particles, ~0.3 m$^2$/gm) at ~1000 K, ~0.1 MPa, in ~0.2 s. The next most effective catalyst may be $Cr_2O_3$, which covers the surfaces of all stainless steels and superalloys, so their use should be limited. Even though the concentration of coke precursors in the working fluid will be kept as low as practical, it should not take too long for most $Cr_2O_3$ to become coated with enough coke (well under 0.1 microns is sufficient) to be well deactivated. (Water, which tends to inhibit coke formation, is not present; and the $H_2$ pressure is very low, so coke methanation is minimal). However, more than enough hydrogen can be released to stop effective engine operation before complete surface deactivation if the gas is not removed fast enough. The surfaces of the turbine blades, nozzles, and HT ducts should be deactivated prior to use. Thermal (uncatalyzed) dehydrogenation will still occur, and one reference (U.S. Pat. No. 4,046,520) implies rather rapid (though unclear) thermal dehydrogenation of isobutane to isobutene at 870 K, 0.4 MPa. However, unappreciated catalytic processes ($Cr_2O_2$—$Al_2O_3$) may have been dominant. Other references (including Weissermel and U.S. Pat. No. 4,678,645) indicate that purely thermal dehydrogenation rates for pure isobutane drop rapidly below 950 K at pressures above 0.05 MPa in the absence of $H_2O$ vapor; and there are reasons to believe this is due at least as much to the absence of the catalytic effect of $H^+$ ions as to the low partial pressure of isobutane. George Olah indicates that most non-oxidative commercial dehydrogenation of isobutane to isobutene is carried out using $Cr_2O_2$—$Al_2O_3$ catalysts at ~850 K and ~0.02 MPa isobutane partial pressure (usually with substantial $H_2O$ and $H_2$ present), and that purely thermal dehydrogenation requires markedly higher temperatures, where cracking dominates, though this final remark seems to be at odds with the data from U.S. Pat. No. 4,046,520. Quantitative rate data are hard to obtain.

A guideline on fluid stability requirements in prior CSP ORCs, where there have been no provisions to deal with gas evolution, is that working fluid loss from reactions be limited to approximately 0.03% per year, or about 1E-11 of the inventory per second. The HT fluid inventory (benzene or toluene) in a conventional 5 $MW_{PE}$ cascaded ORC may be about 100,000 kg. Light-gas production might be about one tenth of total reaction products, or about 0.1 mg/s. The partial pressure of the light gases may build to ~6 kPa in the condenser (2% of total) in one year. (Here we assumed: (a) a mean molecular mass of about 3.5 for the light gas products ($H_2$, $CH_4$, $C_2H_6$, etc.), (b) condensing pressure ~0.3 MPa, and (c) a low-pressure vapor volume of 500 m$^3$.)

Gas production is quite endothermic, so it must be limited to avoid too much loss in net efficiency. Still, gas production three to four orders of magnitude beyond the limit that has previously been deemed necessary can be accommodated if the reaction products can be removed fast enough—and preferably reprocessed. As will be seen later, a typical 1 kg/s DORC will generate ~130 $kW_E$, and it may require an inventory of 400 kg working fluid. The power loss from 0.01 g/s butane dehydrogenation (assuming neither the $H_2$ nor the alkenes are recovered) is about 500 W, or about 0.35% of the electrical output. The additional power loss associated with the separations of the reaction products from the working fluid may be a similar amount. Thus, with effective removal of the reaction products but without their reclamation, a reasonable guideline is to limit fluid loss to 1E-5 of the flow rate, or about 2.5E-8 of the inventory per second. This is about 2,500 times higher gas evolution than has been recommended in CSP ORCs, and this in itself should permit operation at temperatures about 200 K higher than current guidelines for light alkanes, as dehydrogenation is the most significant reaction.

Cost-effective reclamation of the reaction products (both the gases and the heavy HCs) should be practical in installations above about 2 $MW_E$. In such cases, fluid loss rates 4 times higher than suggested above would be acceptable, which should permit another 30 K increase in temperature.

At temperatures above 650 K, cracking may occur—to lighter HCs, and eventually to $CH_4$. The activation energies for these reactions are also quite high, so below 750 K, they primarily occur only on catalytic surfaces. Hydrocracking catalysts include oxides of Co, Ni, Mo, and W, supported on acid-treated $Al_2O_3$. The alumina acid sites catalyze the initial cracking (which is endothermic for isobutane even at 800 K), and the base-metal oxide catalyzes the subsequent exothermic hydrogenation. These base-metal oxides may initially be present as very low coverage on many HT metallic component surfaces, but the surfaces will mostly be protected by $Cr_2O_3$, which will soon be deactivated with coke from reactions subsequent to dehydrogenation and cracking. Moreover, at the very low $H_2$ partial pressure that will be present, the acidic sites active in cracking will also fairly quickly be deactivated with coke. Obviously, the use of catalytically active materials should be minimized. When the internal surfaces of all the HT flow passages become well deactivated with coke, catalytic cracking of light alkanes will nearly cease.

Thermal cracking may ultimately limit the maximum operating temperature, as alkane thermal cracking $K_P$'s and rates typically increase by three orders of magnitude for every 100 K increase in temperature—the $E_a$ for thermal cracking of ethane is 360 kJ/mol, and cracking $E_a$s for propane, isobutane, butane, and isopentane are not much less. Cracking of alkenes and normal alkanes beyond C5 occurs much more readily. Thermal cracking of normal alkanes begins by homolysis of a C—C bond to form two alkyl radicals. Each of these radicals must then abstract hydrogen from another alkane, as this is favored over other possibilities. The radicals can then undergo cleavage to form an ethylene or propylene.

One reference reported very little thermal reactions (~2%) of nearly pure isobutane in a short time (probably several seconds) at 900 K, 0.1 MPa. Another reference (U.S. Pat. No.

5,723,707) indicates ~35% of isobutane is dehydrogenated in ~30 minutes at 920 K, ~0.05 MPa; and another reference (U.S. Pat. No. 4,046,520) showed under 1% cracking to propylene at 850 K, 0.4 MPa. On the other hand, thermal cracking of naphtha (mostly C5-C9 alkanes with little branching) proceeds well over an order of magnitude faster under these conditions. Thermal methanation of isobutane first requires cracking, so it too is very slow below 900 K.

The single most effective measure that can be taken to reduce thermal cracking (and other un-catalyzed reactions) is to minimize the relative residence time in the HT regions. The HT relative residence time is proportional to the ratio of the fluid mass in the HT zones to the total fluid mass. It is the residence time in the upper third of the final super-heater and the ducts from there to the expander turbine that really matter. (Note we sometimes denote the HT recuperator as the "first super-heater", as that is an accurate moniker, so the higher-grade "heater" in the DORC is also denoted the "final super-heater".) With proper attention to flow optimization details, the volume of the ducts from the final super-heater to the expander turbine can be reduced by two orders of magnitude compared to the referenced prior art without increasing losses—a factor of 10 reduction in length and a factor of 3 reduction in diameters are often possible. (An approach to the final super-heater design implied in a later section may allow an order-of-magnitude reduction in the volume of the working fluid at the HT end compared to typical ORC super-heater designs.) Clearly, the importance of minimizing HT residence time has not previously been appreciated.

Alkane cracking and dehydrogenation generally increase the number of moles by a factor of two to three. Hence, although many reaction rates are proportional to concentrations, the rates of the critical reactions in the DORC are inverse with pressure over a very wide range. Thus, it is beneficial to operate at high pressures, but within limits. At pressures much above the critical pressure, the effects of the increased density in the superheated gas outweigh the pressure effects for the catalyzed reactions. Still, the density of a near-critical working fluid decreases much more rapidly than that of an ideal gas as it is heated beyond its boiling point or critical temperature. (For example, the density of isobutane vapor at 3.5 MPa, 410 K is 3 times its density at 3.5 MPa, 650 K.) So the reaction rates increase more slowly than might be initially expected from superheating if the pressure is not much beyond the critical pressure.

It is also important to minimize isomerization reactions—transformations of isobutane into other, less preferred isomers. Such reactions are most effectively catalyzed by acid sites (including aluminas) and especially superacids (such as $HSO_3F$ and many halides). However, in the absence of active surfaces, isobutane isomerizations proceed very slowly below ~750 K. The thermodynamics favor isobutane over n-butane at low temperatures, so it may be desirable to include an isomerization reactor into the liquid stream, either before or after the preheating, to promote conversions of n-butane to isobutane. However, the isobutane/butane ratio then would be about 3 if the isomerization reactor is near 373 K or about 5 if near room temperature, and lower n-butane content may be desired.

Propane is more stable than isobutane, but using too much of it results in operating pressures being inconveniently high and critical temperature being lower than optimum for typical applications. Benzene is nearly immune to dehydrogenation, and it is not easily cracked at low hydrogen pressures. However, its vapor pressure is much too low for it to be a major constituent of the fluid in a cost-effective DORC, and its critical temperature is too high. A mixture of propane, isobutane, and benzene, with isobutane constituting most of the mixture to limit the boiling and condensing glide ranges, should have some advantages. Benzene hydrogenation to cyclohexane at the very low $H_2$ pressure present is much less likely than alkylation with the alkenes present to ethylbenzene, propylbenzene, or butylbenzene. The alkylated benzenes and the octanes from butanes alkylated with butenes can easily be removed from the fluid by the same process that removes all the heavy HCs before they are likely to polymerize or have a major effect on vapor pressures. With 0.05, 0.9, and 0.05 molar fractions respectively for propane, isobutane, and benzene, the mean condensing temperature at 0.4 MPa is 309 K (with a 15 K glide range from saturated vapor to saturated liquid), the mean boiling temperature at 2 MPa is 378 K (with an 8 K glide range), and the vapor pressure is above 0.12 MPa at 270 K. The boiler and condenser can readily be designed to handle these boiling and condensing temperature glides, and the effect of glide on efficiency is negligible in the DORC.

Table 2 summarizes some relevant reaction equilibrium constants where the starting $C_4H_{10}$'s are all isobutane. (The $K_P$s would be higher starting with n-butane than with isobutane.) Few thermal activation energies for these reactions have been reported, but they are very high for cracking of isobutane if not catalyzed, so those rates are much lower than their $K_P$s might suggest.

TABLE 2

Equilibrium Constants

| | Product | $K_P$, 600 K | $K_P$, 700 K |
|---|---|---|---|
| Primary Reactions | | | |
| $i-C_4H_{10} => C_4H_8 + H_2$ | butene | 4.9E−5 | 2.5E−3 |
| $i-C_4H_{10} => 2C_2H_4 + H_2$ | ethylene | 4.5E−7 | 4.4E−4 |
| $2\,i-C_4H_{10} => C_8H_{18} + H_2$ | octane | 3.5E−5 | 2.3E−4 |
| Secondary Reactions | | | |
| $C_6H_6 + C_2H_4 => C_8H_{10}$ | ethylbenzene | 380 | 190 |
| $C_4H_8 + C_2H_4 => C_6H_6 + 3H_2$ | benzene | 6.6E4 | 2.2E5 |
| $C_3H_8 => C_3H_6 + H_2$ | propylene | 1.3E−4 | 5.2E−3 |
| $C_2H_6 => C_2H_4 + H_2$ | ethylene | 4.4E−6 | 2.4E−4 |
| $i-C_4H_{10} => C_2H_4 + C_2H_6$ | ethane | 0.1 | 1.8 |
| $i-C_4H_{10} => C_3H_6 + CH_4$ | methane | 11 | 1.9E3 |

In summary, six measures are required to increase the turbine inlet temperature (for much higher efficiency) from 480 K to 650-820 K while still keeping the vapor pressure at the minimum condensing temperature above 0.1 MPa. In likely order of importance, they are:

1. Accommodate three to four orders of magnitude higher light-gas evolution.
2. Use mixtures of mostly isobutane, propane, benzene, and isopentane for the working fluid such that the total vapor pressure is above 0.1 MPa at the minimum, cold-night, condenser temperature.
3. Minimize the fraction of time the fluid spends at high temperatures.
4. Remove all HCs above C5 and light alkenes to the extent practical, either continually or periodically, except for benzene and perhaps very low levels of highly stable lubricants.
5. Minimize the use of catalytically active materials in contact with the hot vapors.
6. Operate at much higher pressure, but avoid exceeding the critical pressure by more than about 20%.

By keeping those HCs above C5 at a very low level (preferably below 1% except for benzene), coke and gum build-up beyond that desired for catalytic deactivation is minimized. Removal of the undesired reaction products from the working fluid can be done continually or periodically, as discussed later. Eventually, it may still be necessary to burn out excess coke from the final super-heater. In many cases, this may be annual maintenance, though sometimes it may be more optimum to limit $T_{IT}$ such that this is needed only every five or even twenty years.

Even with fairly effective on-line separations, the slow depletion of the isobutane and benzene will require periodic addition of make-up fluid to restore the inventory to the desired amount and optimum boiling point. Periodic fluid changing is still likely, as some species will be created that are not easily separated from the exemplary isomers by processes that can easily be implemented on-line.

An additional benefit of designing for use of mixtures with significant glides is that this makes it possible to achieve optimum performance over the large change in condensing temperatures seen between summer and winter operation in many areas. Improved performance can be obtained by increasing the propane in the winter and increasing the benzene and isopentane in the summer.

The DORC. A system flow diagram for a doubly recuperated dual-source ORC (DORC) is presented in FIG. 1 for the case where low-grade heat is available at about 390 K and mid-grade heat is available at about 720 K, as, for example, when CSP is combined with geothermal, flat-plate solar, or many industrial waste-heat processes.

Different line styles are used for the heat flows, vapor flows, liquids flows, and electrical power flows in the Figures. Thermal power flows are often designated with a subscript T, while electrical power flows are designated with a subscript E. In this specification, the subscripts are often omitted where the context is clear.

In this example, the working fluid is assumed to be pure isobutane, though a mixture of 92% isobutane, 3% benzene, and 5% propane (molar fractions), which has almost identical thermodynamic properties compared to pure isobutane (except for small glides) would have some stability advantages, as noted above. Either is an excellent choice for northern winters, where the minimum night-time lows may often reach 260 K and the daytime highs are about 290 K. (Lower night-time lows can be accommodated by providing some heating to the condenser to keep the vapor pressure above 0.1 MPa.) It is assumed first that soluble lubricants are not needed in the fluid. Lubrication and other heavy HC (HHC) issues are addressed in a later section. Table 3 lists some thermodynamic data for pure isobutane at low pressures, and Table 4 lists some thermodynamic data for isobutane at higher pressures.

TABLE 3

Isobutane at low pressures.

| T, K | p, MPa | Den. kg/m³ | $C_P$, kJ/kg-K | $\gamma$, $C_P/C_V$ | JT, K/MPa | vapor H, kJ/kg | Therm. k, mW/m-K |
|---|---|---|---|---|---|---|---|
| 266 | 0.12 | 589 | 2.23 | 1.419 | −0.4 | 361 | 102 |
| 266 | 0.12 | 3.31 | 1.58 | 1.128 | 34 | 361 | 14 |
| 303 | 0.4 | 545 | 2.46 | 1.436 | −0.2 | 324 | 88 |
| 303 | 0.4 | 10.4 | 1.84 | 1.149 | 24.3 | 324 | 17 |
| 380 | 0.4 | 7.73 | 2.10 | 1.092 | 10.6 | — | 26 |
| 500 | 0.4 | 5.70 | 2.59 | 1.065 | 4.6 | — | 44 |
| 600 | 0.4 | 4.71 | 2.94 | 1.054 | 2.8 | — | 61 |
| 700 | 0.4 | 4.01 | 3.25 | 1.048 | 1.9 | — | 80 |

TABLE 4

Isobutane at high pressures

| T, K | p, MPa | Den. kg/m³ | $C_P$, kJ/kg-K | $\gamma$, $C_P/C_V$ | JT, K/MPa | vapor H, kJ/kg | Therm. k, mW/m-K |
|---|---|---|---|---|---|---|---|
| 270 | 0.4 | 585 | 2.25 | 1.42 | −0.4 | — | 100 |
| 270 | 2.1 | 587 | 2.24 | 1.41 | −0.4 | — | 101 |
| 300 | 2.1 | 552 | 2.40 | 1.42 | −0.25 | — | 90 |
| 376 | 2.1 | 424 | 3.45 | 1.69 | 1.1 | 204 | 65 |
| 376 | 2.1 | 60.9 | 3.09 | 1.49 | 19.7 | 204 | 30 |
| 500 | 2.1 | 32.7 | 2.69 | 1.098 | 5.1 | — | 46 |
| 600 | 2.1 | 25.7 | 2.99 | 1.069 | 2.9 | — | 63 |
| 700 | 2.1 | 21.5 | 3.28 | 1.056 | 1.8 | — | 83 |

The example presented here assumes 1 kg/s working fluid with 10% mean non-condensable gas partial pressure (mostly $H_2$) in the condenser. (The $H_2$ partial pressure elsewhere within the primary cycle will be under 0.01%.) The output power is about 130 $kW_{PE}$, and this probably corresponds to about the smallest size that is likely to be cost effective in the near term for most commercial applications, though specialized applications as small as ~2 $kW_{PE}$ are also possible.

The condensed and slightly sub-cooled fluid at point 1, pressure $p_1$, temperature $T_1$, assumed here to be 302 K, is pumped by liquid pump 21 to the desired high pressure, perhaps 2.5 MPa. The high-pressure condensed fluid passes through filters 22 to remove any particulates (such as wear particles, regenerator debris, coke, or solid lubricant particles) to prevent turbine damage, and this unit may also perform some separation of heavy hydrocarbons (HHCs) and soluble lubricants, if used, though HHC separations are primarily taken care of elsewhere, as disclosed in a later section. The excess inventory tank is not shown, but it is usually between the condenser and the pump.

Figure 2:
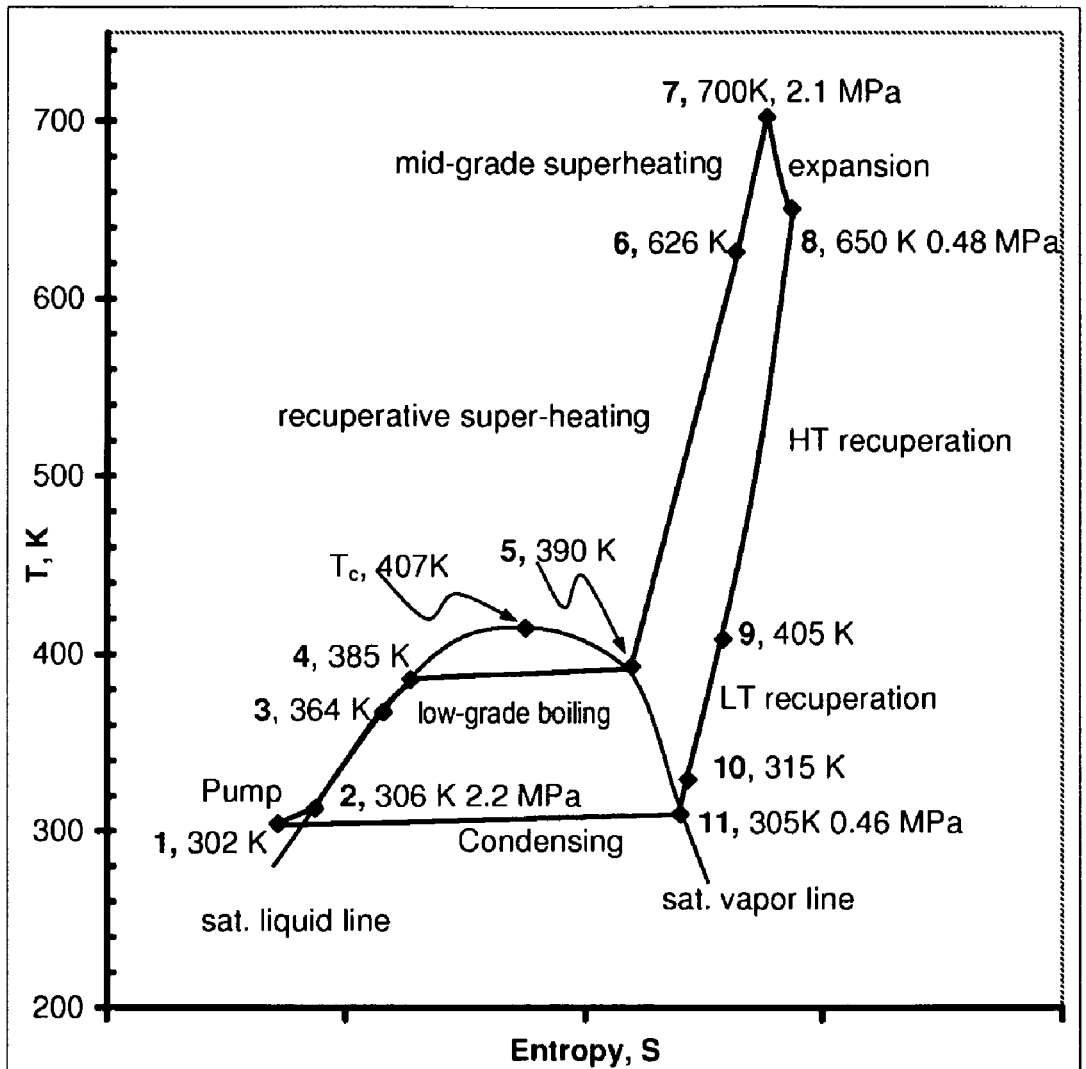
FIG. 2 is a T-S diagram of the doubly recuperated HT-DORC.

As the fluid density here is 25 times the fluid density at the expander turbine inlet, the pump power required is quite small even if there is substantial pressure drop through this separations unit. The cleaned working liquid at about 2.1 MPa then proceeds to the liquid entry port 2 on low-temperature (LT) recuperator 23. See also the T-S diagram in FIG. 2 where the same node numbers, 1-11, appear.

The pressurized liquid is then preheated against the returning low-pressure vapor and leaves the LT recuperator 23 at point 3 on the T-S diagram. In this example, the enthalpy from cooling the returning low-pressure vapor between points 9 and 10 (150 kJ/kg) is sufficient to heat the liquid to about 364 K prior to entering the liquid heater/boiler 24 at point 3. The low-grade source 25 supplies the final liquid heating (~40 kJ/kg) to point 4, here 385 K, and the heat of vaporization (207 kJ/kg). The vapor, possibly slightly superheated, then enters the HT recuperator (or recuperative superheater) 26 at point 5, temperature $T_5$, where it is preheated ("superheated" would be standard parlance) against the returning turbine exhaust vapor. If a mixture were used rather than pure isobutane, the temperature at point 5 would be above that at point 4 by approximately the boiling glide amount.

As the temperature difference between the mid-grade source and the low-grade source is much greater than the difference between the boiling and condensing temperatures, most of the heat from the returning turbine exhaust is available between nodes 8 and 9. This 690 kJ/kg preheats the pressurized vapor to 626 K at node 6 before the vapor enters the compact final superheater 27. The mid-grade source 28 supplies the 235 kJ/kg then needed to further superheat the preheated vapor to the 700 K turbine inlet temperature $T_{IT}$, or $T_7$, at point 7. A liquid intermediary loop, as discussed in more detail later but not shown in FIG. 1, is essential between the mid-grade heat source and the final superheater, at least for $T_7$ above 550 K.

It is also essential that the volume of working-fluid in the upper half of the final superheater 27, and especially within the manifolds at its hot end and the duct 7 from there to the expander turbine inlet be minimized. The mass of working fluid at temperature greater than $(T_6+T_7)/2$, where approximately 7% of the total heat transfer takes place in this example DORC, should be less than 3% of the total working fluid inventory, and more preferably even less than 0.5% of the working fluid inventory. This is probably possible only if flow velocities in the final superheater are mostly above 20 m/s and even above 50 m/s in places.

The vapor is then expanded through turbine 29 essentially to the condenser total pressure (plus a small amount for pressure drops through the recuperators), which is the sum of the condenser vapor pressure (e.g., 0.425 MPa for isobutane at 305 K) and the partial pressures of the non-condensable reaction products, mostly $H_2$, $C_2H_6$, and $CH_4$. In this example, we assume non-condensable partial pressure of 0.04 MPa and expander polytropic efficiency of 0.89. With a mean Joule-Thompson effect of 3.4 K/MPa, the vapor leaves the expander 29 at point 8 at ~651 K after delivering ~150 kW of shaft power (for 1 kg/s). About 96% of this gets converted to electrical power in the generator 30.

The hot turbine exhaust proceeds through the HT recuperator and exits at point 9 at about 15 K above the boiling temperature. It then proceeds through the LT recuperator, from which it exits at point 10 at about 10 K above the condensing temperature. The vapor is then further cooled (~20 kJ/kg), condensed (322 kJ/kg), and slightly sub-cooled (~4 kJ/kg) in the condenser 31 to prevent cavitation in the pump 21. This heat rejection 32 may be via a cooling tower with an intermediary water/glycol coolant loop. The light reaction products mostly remain trapped in the condenser until removed, and this requires minor changes in its design.

The power per flow rate in this example is lower than sometimes seen in CSP ORCs for two reasons: γ is quite low for an extremely superheated organic vapor, and the pressure ratio is rather low—mostly because of the low ratio of the boiling to condensing temperatures, but also because of the non-condensable gas in the condenser. This makes the effectiveness of the HT recuperator quite important. Side benefits of this recuperator are that expander efficiency becomes much less critical and moderately high non-condensable gas pressures can be accommodated in the condenser with little loss in efficiency. While it is still preferable to maintain fairly low $H_2$ partial pressure in the condenser, the task of separating the light gases from the isobutane vapor is not practical at very low gas partial pressures.

The K-values (ratios of vapor phase molar fraction to liquid phase molar fractions) for primary non-condensables in isobutane near 0.4 MPa and 300 K are about 2000, 40, 10, and 6.7 for $H_2$, $CH_4$, $C_2H_4$, and $C_2H_6$ respectively. So, an $H_2$ molar fraction of 0.1 (or partial pressure of 40 kPa) in the condenser vapor implies an $H_2$ molar fraction of 5E-5 in the liquid; and a $C_2H_4$ molar fraction of 1E-4 in the condenser vapor implies a $C_2H_4$ molar fraction of 1E-5 in the liquid. Any process that addresses the hydrogen buildup should also accommodate the other gases, as they are much more soluble and produced at lower rates. The relative $H_2$ partial pressure on the high-pressure vapor side is the same as the $H_2$ molar fraction in the liquid, 5E-5, and of little effect. With a 10% $H_2$ partial pressure in the condenser, the saturated mass fraction of $H_2$ dissolved in the condensed fluid will be about 1.7E-6.

In this example, about 250 kW of low-grade heat is used, and about 235 kW of mid-grade heat is needed. After powering pumps and fans (including the separations processes discussed earlier and in the next section), about 135 kW of net electrical power is produced from a single, small, inexpensive, expander turbine. Hence, the efficiency of utilization of the mid-grade heat is 57%, or the efficiency of utilization of the combined sources appears to be about 28%, though some losses were ignored. For comparison, efficiency of prior geo-thermal ORCs has usually been ~12%, and CSP has usually seen peak performance of 25-31%. So the performance of the DORC appears to be ~60% better than the weighted average of prior ORCs.

Light-gas Removal from the Condenser. There are basically two approaches to removal of the light gases from the condenser—periodic venting, or a continual, on-line separation process.

A fluid reaction loss rate of 1E-5 of the fluid flow rate corresponds to a hydrogen production rate of about 3E-7 kg/s at a fluid flow rate of 1 kg/s. For a total vapor volume in the condenser of 2 $m^3$, an $H_2$ pressure of 40 kPa amounts to 0.06 kg, which is approximately the amount of $H_2$ produced in two days at the above rate. Hence, a daily or perhaps weekly gas venting process would be adequate. Venting the light gas will also result in venting of an even larger amount of working fluid. For example, if the light gas (assume a mean molecular mass of 4) is vented when its partial pressure reaches 20% of the vapor pressure, the mass of vented working fluid will be about 60 times that of the light gas, or ~7 kg. Preferably, this would be compressed into a holding tank for subsequent separations using standard processes. There are a number of well known ways for separating such a mixture, including membranes, selective absorbents, and fractional distillation.

Alternatively, continual, on-line gas separation 33 could be utilized. With the moderately high condenser pressure (as desired for other reasons), selective membranes can easily keep the light-gas relative partial pressure below 0.2 with low loss of the working fluid. For example, the glassy polymer polyvinyltrimethylsilane has about 100 times the molar permeance to $H_2$ as to isobutane, and other membranes may have even better separation factors. Hence, in removing 3E-7 kg/s $H_2$ at 10% partial pressure with a single separation stage, one could achieve isobutane mass flow in the light-gas permeate of about 3E-7 kg/s. A very small vacuum pump 34 is needed on the permeate stream, as the pressure there must be well below the $H_2$ partial pressure in the condenser. The permeate, possibly 10% molar fraction $C_4H_{10}$ with the balance mostly light gases, would be vented in small DORCs, but in larger DORCs it could easily be further separated. Most of the permeate's chemical energy is in the $H_2$, which could be compressed and sold. Of course, the isobutane, propane, isopentane, and benzene could be reused. With reclamation, 5-10 times higher fluid reaction rates may be preferred to enable operation at 30-50 K higher $T_{IT}$, and 3-4% higher cycle efficiency.

The theoretical minimum power required for pumping 5E-6 kg/s light-gas permeate from 10 kPa to 200 kPa is about 12 W. In practice, this may require several hundred watts, and it may be difficult to get this power loss below 100 W even in a very small DORC. This is one factor that will limit efficiency of DORCs below several kilowatts.

Lubricants and Heavy Hydrocarbon (HHC) Separations. The pump 21 could probably be designed to operate satisfactorily without a lubricant in the working fluid (for example, by using $MoS_2$, teflon, or wear-resistance composite coatings), but the use of high-stability soluble lubricants may improve lifetime and reduce costs. If soluble lubricants are used, it would be very difficult to achieve adequate HHC separations in filter/separator 22 without incurring unacceptable pressure losses. A soluble lubricant would have much higher boiling point than benzene, so it, like the other HHCs (hydrocarbons of molecular mass greater than 79, or having n.b.p. greater than that of benzene), would quickly concentrate in the boiler—and hence be depleted elsewhere.

If the lubricant is sufficiently stable (note that oxidation resistance and flash point are not important here), there would be no concern from it vaporizing in the boiler and continuing on through the cycle. A very minor vapor flux of the lubricant through the cycle would be sufficient to maintain adequate pump lubrication. Common lubricants, anti-wear additives, antioxidants, and stabilizers would be disastrous (possibly even deposit active catalysts) in the final superheater, but very low vapor concentrations of some light alkylated aromatics, especially benzenes, or light poly-$\alpha$-olefins should be fine. Soluble lubricants could significantly decrease the boiler vapor pressure (and hence pressure ratio) for a given boiling temperature. The cycle analysis becomes more complex, as the fluid composition is then very different in the boiler than elsewhere, but the effect on efficiency is small. Cycle efficiency is quite insensitive to pressure ratio, as shown later.

The K-value for octane for the example boiler conditions is 0.15. The K-value for the lightest usable lubricants would likely be below 0.04 (it is below 0.04 for dodecane, for example) and their molecular weights would probably be above 150, so their concentration in the boiler may be over 30 times their concentration elsewhere. However, lubricant molar concentrations in the pump below 0.01% may be adequate, as good lubricants bind tightly to cool metal surfaces and a lubricant film thickness of 0.1 to 0.5 microns is sufficient.

The easiest way to deal with the heavy reaction products is to periodically or continually flush the boiler liquid through flush valve 41 and reclaim the lubricants. The pentanes, butanes, and other lights can easily be flashed from the flushed fluid in flash drum 42, and the remaining boiler concentrate (bottoms product, which may have normal boiling point below 260 K if soluble lubricants are being used) would be sent to a bottoms separation process 44. The flash gas (perhaps 99% of the total flush stream) could simply be compressed 43 back into the condenser, as it would be quite similar to fresh working fluid except (primarily) for higher concentrations of benzene and pentanes, or it could be further processed to a more preferred mixture, either locally or elsewhere, before reuse.

The (minute) bottoms product would consist mostly of pump lubricants if such are being used, and they would be separated for reuse. Separations may be done with a combination of selective membranes, selective absorbents, filtration, catalyzed reactions of undesired components to produce species more readily separable, distillation, freezing, and other processes. Note that boiler flushing and the subsequent separations associated therewith are not a significant part of the thermodynamic cycle as the mean flow rate is so low, but they are critical to its lifetime and cost effectiveness.

The flushing could be done continually, though it may be easier to do it periodically—because the rate needed is so low. The flushing rate need only be sufficient to keep the vapor pressure in the boiler within desired limits and to keep the concentration of the primary coke precursors (condensed polynuclear aromatics and heavy alkenes) at very low levels in the vapor. The coke precursors are not primary thermal-reaction products, so their production rates are extremely low if not catalyzed—well below 1E-8 kg/s. Moreover, since their vapor pressures are quite low, their K-values in the boiler would also be very low, so reasonable concentrations could be allowed in the boiler liquid before there would be enough in the vapor to matter. (The possibility of benzene polymerizing to polynuclear aromatics on acidic-oxide surface sites suggests the benzene concentration in the working fluid should be kept fairly low.) If the formation rate of coke precursors is 1E-8 kg/s and their mean K-value is 0.03, flushing the boiler at 1E-5 kg/s would keep their equilibrium vapor molar concentration below 1E-5, which is probably low enough to keep the coke formation rate negligible, as the various mechanisms are generally second order (or higher) with respect to precursor concentration. Keeping the octane concentration (from a primary isobutane reaction, as shown in Table 2) in the boiler liquid low enough (below 1% molar basis, corresponding to about 0.3% mass basis in the condenser and inventory) to keep the vapor pressures within desired limits may require a higher boiler flushing rate than that imposed by coke-precursor production. Still, a boiler flushing rate of even 2E-4 of the cycle flow rate could require less than 0.1% of the electrical output power if the bottoms separations 44 and flash-gas recompression 43 are well implemented.

Of course, it is desirable to produce enough coke initially to deactivate all the surfaces in the superheaters, ducts, and expander. If the surface area there is 200 m$^2$ (a rough estimate, depends on passage dimensions) and 0.1 micron coverage is sufficient for deactivation, 0.03 kg of coke deposition is needed. So it may preferably to not operate the HHC separations for the first several days.

A 50 K decrease in $T_{IT}$ may make the difference between needing continuous and quarterly boiler flushes, but it may also decrease cycle efficiency by 4%. The optimum temperature and fluid maintenance program will depend on (a) the higher-grade source temperature, (b) the size and location of the DORC, and (c) developments in separations technologies, especially membranes. Complete fluid changes will still eventually be needed (possibly quarterly, annually, or every five years) to take care of buildup of less desired isomers that are not easily separated by the simple methods disclosed herein.

High-performance Heat Exchange. Highly effective recuperation is critical to achieving the desired level of performance in a compact engine, and the challenges are greatest in the gas-to-gas exchange seen in the HT recuperator (though there may be a little glide-phase boiling there). Doty, in U.S. Pat. No. 4,676,305, discloses a compact method of achieving highly effective recuperation with low pressure drop for gases. However, this microtube recuperator has not yet been shown to be commercially competitive with the brazed plate-fin type, in wide usage in recuperated open Brayton cycles in the 30-250 kW range. See, for example, the microturbines available from Capstone Turbines Corporation, of Chatsworth, Calif.

It is worth pointing out that even more than two decades after compact heat exchanger theory has been very well understood by many, the misconception persists in some circles that high-effectiveness gas-to-gas exchangers can utilize tubing diameters of 1-3 cm and lengths of 4 to 20 m without incurring huge mass penalties. The fact is, however, that optimized, compact exchangers require low flow velocities (several percent of the sonic velocity), flow-path lengths in the range of 0.2 to 2 m and passage hydraulic diameters of 0.5 to 3 mm, with the larger diameters corresponding to pressures near 0.1 MPa and the smaller sizes corresponding to pressures above 0.5 MPa. They also require the use of construction materials having fairly low thermal conductivity.

An alternative to paralleling tens of thousands of microtubes that has seen rather little usage but appears to be the most competitive for some compact recuperation applications is the rotating honeycomb regenerator, as used in some turbine engines where system mass is critical. Oda et al in U.S. Pat. No. 4,304,585 disclose an early ceramic design. Regenerators have seen very little usage in related applications largely because of the difficulties in obtaining adequate isolation between the high-pressure and low-pressure streams and because of the shedding of ceramic particles, leading to turbine abrasion.

Ceramic is normally selected for honeycomb regenerators in recuperated aero-turbine applications because of the need for oxidation resistance at high temperatures and the advantage of low thermal conductivity in the flow direction. Rotating ceramic honeycomb regenerators have demonstrated effectiveness above 98%, while the brazed plate-fin recuperators seldom achieve more than 87% effectiveness, primarily because of cost and mass optimization reasons. The honeycomb regenerators are an order of magnitude more compact and an order of magnitude less costly for a given exchange power and effectiveness than plate-fin microturbine recuperators—which are an order of magnitude more compact than the gas-to-gas exchangers often seen in prior-art CSP ORCs and in most chemical engineering applications.

As oxidation resistance is irrelevant in the DORC regenerator and temperatures are lower than in gas-turbine exhausts, the DORC HT regenerator could be made at lower cost and with much higher reliability from a low-conductivity alloy honeycomb, such as stainless steel, silicon bronze, titanium, zirconium, or possibly some aluminum alloys. The thermal conductivity of silicon-nickel-bronze can be below 40 W/m-K, and 120 W/m-K is sufficiently low except perhaps for the most compact applications. For example, a magnesium alloy, with thermal conductivity about 90 W/m-K, has been used experimentally in a helicopter turboshaft engine. Titanium alloys may be ideal, and it appears that the relative cost of these alloys will decrease over the next decade. The much higher thermal stress tolerance of metals compared to ceramics is extremely beneficial with respect to durability, as thermal stress is a primary factor limiting regenerator design and contributing to shedding of particles from ceramic regenerators.

The regenerator cost for a given performance is typically near minimum when pore diameters are about 0.7 mm for mobile gas-gas exchange applications. The relevant design theory, well understood for more than three decades, has recently been reviewed and updated by David G Wilson in "Design and Performance of a High-Temperature Regenerator Having Very High Effectiveness, Low Leakage and Negligible Seal Wear", paper GT 2006-90096, Turbo-Expo 2006. Pore hydraulic diameters as large as 5 mm would still be superior with respect to cost and effectiveness to that normally seen in prior-art ORCs using conventional shell-and-tube counterflow heat exchangers, where tubes have often had diameters of 1-3 cm.

The use of a metal for the honeycomb may permit a satisfactory solution of the sealing problem in larger HT recuperators, though probably not in smaller HT recuperators. The cut-off point is not yet clear, but it is probably in the vicinity of 1 $MW_E$ DORC output power. At lower power, the brazed plate-fin type may be the best current option. However, other novel gas-to-gas heat exchangers, including the subject of a separate co-pending patent application, may be better.

The custom condensers seen in many prior ORCs have been one of their larger cost items, but this need not be the case. Dry-air condensers have been extremely well optimized by numerous air-conditioning companies over the past three decades. At this point, the DORC condenser problem is simply a matter of selecting the best option off the shelf. The pressures in the DORC condenser will not be much lower than seen in many industrial air-conditioning systems (e.g., those using fluids R124, R401C, R416A, or R600a) that have been manufactured in large sizes. For example, "80-ton" (280 kW of cooling) air conditioners are widely produced. The air-flow passage lengths in their condensers are under 6 cm, and air-passage thicknesses are ~1.5 mm. The condenser in such a unit typically rejects about 350 $kW_T$ at a δT (dry air) of about 10° C. Such a condenser would be well suited to a 100-200 $kW_E$ DORC. Moreover, one could easily parallel as many of these condensers as needed for much larger DORCs. The DORC working fluid is very inexpensive and the vapor density is rather high (~10 kg/m$^3$), so there is no problem with running long lines to reach hundreds of these condensers if needed.

The LT recuperator can be accommodated by first learning from the highly developed liquid-to-gas exchangers best exemplified in automobile radiators. This common cross-flow gas-to-liquid exchanger does not permit high effectiveness, but it does provide very high heat transfer per cost and mass. To achieve the high effectiveness needed in the LT recuperator, it is simply necessary to arrange 5 to 30 of such exchangers in series, with the liquid flowing serially from the first to the last and the gas also flowing serially, but from the last to the first. Such a counterflow exchanger is likely to be an order of magnitude less costly and massive than most conventional shell-and-tube gas-to-liquid counterflow exchangers of similar flow rates, pressure drops, and effectiveness. Some adaptations are required, as the pressures and temperatures are somewhat higher than these mass-produced exchangers will handle. The simple solution is to instead use a similar series arrangement of 5 to 30 heat-pump condenser cores, which, though intended for two-phase-flow in the high-pressure fluid, are quite similar in basic design (and cost effectiveness) and will handle the pressures. Only minor modifications are needed to handle the slightly higher temperatures and single-phase, tube-side flow.

High-temperature Heat-Transfer Fluids (HT-HTFs) and Thermal Storage. The heat-transfer fluid (HTF) from the solar field to the final superheater and thermal storage has very different requirements from the DORC working fluid. The primary concerns in the former are high chemical stability at the collector temperature, low health hazard, low vapor pressure (to simplify collector and thermal storage design), fairly low cost, and high autoignition temperature (AIT)—even though inert-gas pressurization would normally be incorporated. It is also beneficial to have high thermal conductivity, low viscosity, and freezing point above the minimum night-time temperature. However, this last point is not essential, as thaw-out measures can be implemented. Molten salts, water, silicone fluids, and other high-boiling organics are acceptable for various applications. Note that the chemical stability requirements are at least four orders of magnitude greater for the HT-HTF than for the DORC working fluid, as (A) the DORC working fluid spends only ~1% of its time near its peak temperature, (B) its peak temperature is at least 40 K lower, and (C) it may be at an order of magnitude higher pressure while it is hot.

As mid-grade thermal storage is essential in renewable applications, the heat transfer problem cannot be divorced from the thermal storage problem. Phase-change thermal transfer using water has recently been advocated by some as the most cost effective approach, but the complications associated with massive thermal storage above 4 MPa appear to set the upper practical limit at about 520 K for water. The costs and complications associated with phase-change methods in thermal transfer and massive storage using any other known fluid at higher temperatures appear prohibitive. The best approach to higher temperatures is to utilize gravel flooded with a stable liquid medium of low vapor pressure.

Low-grade (350-500 K) thermal storage can be implemented at very low cost using concrete, limestone, or granite gravels filling over 85% of the space in a large oil tank, essentially according to the prior art. A low cost HTF such as dioctyl phthalate or a synthetic 40-wt diesel-engine oil can easily be utilized in this temperature range. The mid-grade (680-820 K) storage may be implemented similarly, though perhaps only granite would make suitable filler at the higher temperature. However, the HT-HTF is considerably more expensive and the system more complex—hence, the motivation for better HT-HTFs.

Tin-lead alloys are inexpensive and may be acceptable as an HTF, but the solubility of iron in tin is about 0.1% at 650 K, and this may lead to excessive exchanger erosion (even after the molten alloy becomes saturated with iron, as there will be some thermal gradients in the fluid). The solubility of iron in both bismuth and lead is at least an order of magnitude lower than in tin. The bismuth-lead eutectic (55% Bi, 45% Pb) has good thermal conductivity (~5 W/m-K at 350° C.) and a melting point of only 125° C., which reduces warm-up (thaw-out) problems. For comparison, its thermal conductivity at this temperature is 10 times that of water, 15 times that of $H_2$, and 70 times that of most oils. If the exchangers and ducting are of stainless steel, low cost tin-lead alloys can be used for the HTF; and tin-lead alloys of relatively low tin content may also be fine with low-cost steel alloys for the ducts and exchangers.

The high thermal conductivity of a salt or molten alloy is particularly beneficial in the final superheater, as it must be very compact to minimize cracking of the DORC working fluid, as previously noted. The warm-up (thaw-out) can be handled with resistive heaters on those ducts and exchangers that are not directly heated by concentrated solar radiation. It could also can be handled with a small, parallel, exchanger network with a high-stability, high-boiling organic as the exchanger fluid. Alternatively, freezing can be prevented by maintaining minimal flow throughout the night.

Molten salts, especially mixtures of $NaNO_3$, $KNO_3$, $NaNO_2$, and $Ca(NO_3)_2$, have often been used. Their freezing points are not much lower than those of some lead alloys and their upper useful temperature limits are lower. For example, $KNO_3$ decomposes at 670 K, $NaNO_3$ decomposes at 650 K, and the others have yet lower limits, though some mixtures have usable temperature ranges. However, there are security risks, as all can easily be used to make powerful explosives of limited stability. Moreover, their NEPA health ratings are "2, highly hazardous". A complication with either salts or alloys is that they are solid below 400 to 500 K, and this significantly complicates handling and operations.

A high-stability, high-boiling organic liquid may be preferred. Even though the thermal conductivities of these fluids are very low compared to those of molten alloys or salts, they are still twice that of gaseous isobutane and their relative volumetric heat capacities are quite high. The advantages of these fluids compared to alloys may include no freezing problems, no metal erosion, lower density, lower toxicity, lower cost, and simpler disposal problems. Silicone fluids (such as Dow Corning 550, AIT of 755 K, but not suitable above 550 K for long term usage) and low-grade HC mixtures, such as Exxon Caloria HT-43 (AIT of 627 K) have been used. Some more attractive organic fluids with n.b.p. and AIT both above 660 K, pour point below 320 K, Gibbs free energy of formation per mass at 700 K less than 3.5 kJ/g, and acceptable stability and safety are: (A) polyphenyl ethers (PPEs, aerospace lubricants and diffusion-pump oils, 5-ring type 5P4E has AIT-880 K, n.b.p.=749 K, 290 K pour point, $\Delta G_f$~2 kJ/g, non toxic, has been used in short-term vapor-phase lubrication at up to 870 K), (B) polyol esters (POEs, most type-2 aviation turbine oils, AIT usually ~670 K, but AIT and n.b.p. can be over 740 K), (C) polyalphaolefins (PAOs, a major component in type 5W50 synthetic engine oil, 16 cSt at 100° C., AIT usually 650 K, but AIT can be ~700 K in heavy PAOs), (D) phenyl silicones, (E) fluorocarbons, (F) polymer esters (PEs), and (G) mixtures of PPEs, PAOs, POEs, PEs, and high-boiling alkylated polynuclear aromatics, especially triphenylenes and chrysenes with normal boiling points above 770 K. Limited data are available on such, though octylchrysene ($C_{26}H_{28}$), for example, has n.b.p.=789 K, AFT probably above 820 K, and pour point probably below 320 K. See Table 1 for data on two other alkylated polynuclear aromatics.

The fact that some of the more promising prospects are currently one to three orders of magnitude more expensive than would be considered practical for a near-term HTF is not a long-term issue. For reference, it is useful to note the following current global annual production rates and bulk prices: ~3.5E12 kg/yr for petroleum (~$1/kg), ~4E10 kg/yr for conventional lubricants (~$2/kg), ~5E8 kg/yr for PAOs (~8/kg), ~5E7 kg/yr for high-temperature POEs (~12/kg), and probably under 2E4 kg/yr for 5-ring PPEs (~1000/kg). It is also useful to note that production capacity for very high grade, highly branched, heavy iso-paraffins (which are essentially the same as top-grade PAOs) has increased rapidly during the past eight years. This rapid growth, based on high-quality Fischer-Tropsch waxes, is expected to continue for at least the next decade. Hence, the price of synthetic oils similar to PAOs should drop substantially over the coming decade—especially the heavier grades. If the demand is sufficient, even 5-ring PPEs should eventually be able to be produced at a price similar to the current price of PAOs.

Perhaps the best way to minimize the volume of working fluid in the final superheater is to use a sequence of two heat transfer fluids, where a salt or molten alloy of more than 40% lead (Pb) is used for transfer of heat into the final superheater. The transfer of heat from the solar field or from the thermal storage to the lead alloy could be accomplished using a salt mixture or a high-boiling organic, such as described above.

Off-design Operation. Efficiency in highly recuperated cycles changes very slowly with changes in mass flow rate or temperature. The cycle would probably be designed for optimum efficiency at heat fluxes about 30% less than peak mid-grade flux. Here, temperatures would not be much different from peak conditions, but mass flow rate would be about 30% less than peak. At peak heat fluxes, HT recuperator effectiveness would drop from about 92% to about 89%, but expander efficiency would probably be down only 1% (it might be maximum at 85% of peak flux). So total system efficiency might drop from about 28% to about 26% at peak flux. At half of peak source flux, the gain in HT recuperator effectiveness would fully offset the drop in expander efficiency, and total system efficiency would still be 28%. As mass flow continues to drop at lower thermal fluxes, the efficiency would slowly drop.

The low-grade thermal flux essentially determines the mass flow rate. If the low-grade source is much less expensive than the mid-grade source, the system might be designed with excess low-grade thermal flux available most of the time and suitable control methods so that the mid-grade source could be utilized more effectively most of the time.

The efficiency of utilization of the mid-grade heat source is so high that it would often make sense to supply it from combustion of biomass if there is more low-grade heat available than can be effectively utilized in the DORC with the other, available, mid-grade, renewable sources.

Design Variations. If low-grade heat sources of higher quality are available, the system cost effectiveness improves considerably, partly because the increased boiling temperature increases the pressure ratio, which increases the power per heat exchanger cost much more than it increases the expander cost. If the low-grade source temperature is high enough, it is also possible to operate under supercritical conditions in the heater/boiler, in which case the phase change may be gradual from point 3 to well beyond point 5. However, this would make it more difficult to achieve uniform flow (and hence high effectiveness) in the HT recuperator, and it would also compromise the HHC separations process and complicate the low-grade heat transfer. For higher low-grade source temperatures, it is better to increase the critical temperature of the fluid by increasing the benzene and isopentane fractions while eliminating the propane, at least if the mid-grade source temperature is not so high as to lead to unacceptable fluid degradation rates. At 0.1 molar fraction benzene, 0.7 isopentane, and 0.2 isobutane, the critical temperature is 462 K (at 3.7 MPa), the glides are still manageable (300-320 K for condensation at 0.15 MPa), and the vapor pressure at 290 K still exceeds 0.1 MPa.

If the low-grade heat source has very low cost and very high availability relative to the mid-grade heat source, the LT recuperator may not be justified, even though efficiency of utilization of the low-grade source would then be quite low.

If the mid-grade temperature (in kelvins) is less than 1.2 times the low-grade source temperature, the HT recuperator for assisting in superheating may not be justified, though efficiency of utilization of the mid-grade source may suffer.

The DORC with just the LT recuperator could be advantageous compared to a recuperated ORC even if the mid-grade temperature is as low as 1.15 times the low-grade source temperature, but such is cycle is not much different from some prior recuperated ORCs.

In OTEC applications, the working fluid may be mostly propane, as its higher thermal conductivity, vapor pressure, and y are all beneficial, and the boiling temperature would still be well below its critical temperature. The lower vapor pressure ratio between the condensing and boiling temperatures (~1.5) may offset those advantages, but the vapor pressure of isobutane at the boiling temperature (~300 K) may not be high enough (only 0.37 MPa) to allow very high $T_{IT}$ without excessive dehydrogenation or cracking. This concern is compounded because the combination of a low condenser pressure (0.23 MPa at 285 K) and a very low pressure ratio (~1.6) makes it a little more difficult to accommodate high evolution of light-gas.

A cascaded gas-steam-DORC cycle near a geothermal source may be the best way to utilize biomass. Combustion of the biomass, possibly after gasification, could power a gas turbine, perhaps with $T_{IT}$ up to 1500 K, and its exhaust could provide the heat for a steam turbine, perhaps with its $T_{IT}$ over 900 K. The steam condensing temperature could be higher than normally seen in steam cycles, perhaps 400-450 K, to reduce the cost of the condenser and turbine. The steam condenser could provide the mid-grade heat to a DORC, with geothermal providing its low-grade heat. Efficiency of utilization of the biomass might exceed 90% if the geothermal input is not counted. Biomass efficiency nearly as high would be possible even without the steam cycle between the gas turbine and the DORC by using lower gas-turbine temperatures and a higher DORC mid-grade temperature, heated by the gas-turbine exhaust.

The cycle shown in FIG. 1 but without the low-grade source 25 and the separations processes 33, 34, 35, 41, 42, 43, 44 is similar to some prior art highly recuperated ORCs. The general appearance of the T-S diagram would also be similar, but the temperatures and power flows are different, as all the liquid preheating and boiling enthalpy must then come from the two recuperators and the mid-grade source 28. The addition of the light-gas separations 33, 34, 35 to such a prior art ORC allows it to operate at substantially higher $T_{IT}$ and thus achieve higher efficiency. The addition of the HHC separations 41, 42, 43, 44 allows it to operate at still higher $T_{IT}$ and thus achieve yet higher efficiency.

An overriding assumption throughout this disclosure has been that the condenser pressure must exceed 0.1 MPa for reliable, compact, and efficient energy conversion from low-grade sources, and this has ruled out consideration of water as the working fluid. However, it is possible that compactness may not be important in some cases. It is also possible that the low-grade heat source may be available at a temperature above what appears to be the upper practical boiler temperature limit for a mixture of mostly isobutane (~420 K) or mostly isopentane (~470 K). Benzene could be used as the primary constituent of the working fluid for low-grade heat sources up to ~550 K, but that would probably lead to air-ingress problems from the sub-atmospheric condenser (and possibly polynuclear aromatic condensation problems in the superheaters). Hence, water is probably the best choice for the working fluid for many cases with low-grade sources above 420-470 K (depending on the higher-grade source temperature), and the cycle would no longer be an "organic" Rankine cycle but rather a steam Rankine cycle.

With water as the working fluid, absolute avoidance of air ingress is not so important (there are no deleterious chemical reactions between air and water), so the condenser can be at a pressure far below 0.1 MPa, as is required with water condensing at near ambient temperatures. The size of the condenser is not increased as much as might be initially expected from the very low condenser pressure (6 kPa at 310 K) because of the high thermal conductivity of water compared to organic fluids. Moreover, the size of the turbine is not increased as much as might be expected from the low expander outlet pressure because of the low molecular weight of water. Of course, superheated steam cycles with reheat have been in use for more than a decade, and they have included separation of non-condensables from the condenser and separation of low volatility components from the boiler liquid. It also appears that some have included utilization of low-grade sources for liquid preheating, but none have utilized recuperation above the boiling temperature. They have also generally had condenser pressure above 10 kPa.

RELEVANT ART

1. M Kanoglu, "Exergy analysis of a dual-level binary geothermal power plant", *Geothermics,* 31, 709-725, 2002.
2. A Borsukiewicz-Gozdur, W Nowak "Comparative analysis of natural and synthetic refrigerants in application to low temperature Clausius-Rankine cycle", *Energy,* 32, 344-352, 2007.
3. K Weissermel, H J Arpe, *Industrial Organic Chemistry,* 4th ed., Wiley, 2003.
7. C H Bartholomew and R J Farrauto, *Industrial Catalytic Processes,* Wiley, 2006.

8. J D Scader and E J Henley, "Separation Process Principles", 2nd ed., Wiley, 2006.
4. B T Liu, K H Chien, C C Wang, "Effect of working fluids on organic Rankine cycle for waste heat recovery", *Energy*, 29, 1207-1217, 2004.
5. E Prabhu, "Solar Trough Organic Rankine Electricity System (STORES)", NREL/SR-550-39433, http://www.nrel.gov/docs/fy06osti/39433.pdf, 2006.
6. H Price and D Kearney, "Reducing the Cost of Energy from Parabolic Trough Solar Power Plants", NREL/CP-550-33208, 2003.
7. H Price and V Hassani, "Modular Trough Power Plant Cycle and Systems Analysis" NREL/TP-550-31240, 2002.
8. A P Steynberg, M E Dry, eds., Studies in Surface Science and Catalysis 152, Fischer-Tropsch Technology, Elsevier, 2004.
9. R DiPippo, "Geothermal Power Plants: Principles, Applications and Case Studies", Elsevier Ltd, Oxford U.K., 2005.
10. D G Wilson and J Ballou, "Design and Performance of a High-Temperature Regenerator Having Very High Effectiveness, Low Leakage and Negligible Seal Wear", paper GT 2006-90096, Turbo-Expo 2006, Barcelona.
11. G Olah and A Molar, "Hydrocarbon Chemistry", 2nd ed., Wiley, 2003.
12. L R Rudnick, "Synthetics, Mineral Oils, and Bio-based Lubricants: Chemistry and Technology", CRC, Boca Raton, 2006.
13. D Mills, G L Morrison, and P LeLievre, "Design of a 240 MWE Solar Thermal Power Plant", Ausra, http://www.ausra.com/pdfs/Design240MWsolarthermalpowerplant_Mills__2004.pdf 2004.

| U.S. PATENT DOCUMENTS | | | |
|---|---|---|---|
| 4,046,520 | September 1977 | Kemp et al | 44/56 |
| 4,304,585 | December 1981 | Oda et al | 65/43 |
| 4,676,305 | June 1987 | Doty | 165/158 |
| 4,738,111 | April 1988 | Edwards | 60/671 |
| 5,259,444 | September 1993 | Wilson | 165/8 |
| 5,639,929 | June 1997 | Bharadwaj | 585/658 |
| 5,723,707 | March 1998 | Heyse et al | 585/444 |
| 6,857,268 | February 2005 | Stringer et at | 60/651 |
| 7,013,644 | March 2006 | Radcliff et al | 60/614 |
| 7,100,380 | September 2006 | Brasz et al | 62/114 |
| 7,225,621 | June 2006 | Zimron et al | 60/651 |

Although this invention has been described herein with reference to specific embodiments, it will be recognized that changes and modifications may be made without departing from the spirit of the present invention. All such modifications and changes are intended to be included within the scope of the following claims.

I claim:

1. A Dual-source Organic Rankine Cycle (DORC) for converting thermal power from the combination of a low-grade thermal source and a mid-grade thermal source to electrical power, said method characterized by:
condensing a working fluid from a low-pressure cool vapor at total pressure $p_1$ to a low-pressure condensed working fluid at temperature $T_1$ in a condenser, where $p_1$ is greater than 100 kPa but less than 1 MPa, and where $T_1$ is greater than 260 K but less than 340 K,
producing pressurized working liquid by pumping said low-pressure condensed working fluid to pressure $p_2$, where $p_2$ is greater than 1.3 $p_1$ but less than 5 MPa,
heating and boiling at least a portion of said pressurized condensed working fluid in a boiler using thermal power that originates from said low-grade source to create pressurized vapor at temperature $T_5$,
using a high-temperature (HT) recuperator to produce preheated vapor at temperature $T_6$, greater than $T_5$, utilizing heat from an expander exhaust vapor flow,
using thermal power that originates from said mid-grade source to produce final superheated vapor at temperature $T_7$, greater than $T_6$,
expanding said super-heated vapor at temperature $T_7$ through a turbine to low-pressure hot vapor of temperature $T_8$ and pressure near $p_1$ to produce shaft power for subsequent conversion to electrical power, cooling hot vapor through said HT recuperator to warm vapor at temperature $T_9$, greater than $T_5$,
further cooling said warm vapor to at least its condensing temperature and repeating the above cycle,
said method further characterized as including means for separating a portion of the heavy hydrocarbons (HHCs) from said working fluid, where HHCs are defined as having molecular mass greater than 79 and normal boiling point greater than 354 K.

2. The DORC of 1 further characterized in that the mass fraction of lubricants in the condensed fluid in said boiler is greater than 0.003 but less than 0.03.

3. The DORC of 1 further characterized as utilizing a molten alloy comprised of at least 40% lead (Pb) for transferring heat into said final superheater.

4. The DORC of 1 in which the HHC separation process is further characterized as including:
draining boiler liquid from the boiler,
flashing low-boiling components from the drained boiler liquid in a flash drum,
compressing at least a portion of the flashed low-boiling components,
performing an additional separations process on the bottoms product from the flash drum.

5. The DORC of 3 further characterized in that said lubricants are selected from the set comprised of alkylated benzenes and polyalphaolefins.

6. An Organic Rankine Cycle (ORC) for converting thermal power from a mid-grade thermal source to electrical power, said method characterized by:
condensing a working organic fluid from a low-pressure cool vapor to a low-pressure working liquid,
producing pressurized working liquid by pumping the low-pressure working liquid to a higher pressure,
heating and boiling the pressurized working liquid to produce a high-pressure vapor from a boiler,
expanding the vapor through a turbine to low-pressure vapor to produce shaft power for subsequent conversion to electrical power,
cooling the hot vapor to near its condensing temperature,
separating light gases from the cooled vapor mixture using selective membranes and a vacuum pump,
repeating the above cycle,
said ORC further characterized as including means for separation of heavy hydrocarbons from the organic working fluid.

* * * * *